United States Patent
Ohyama et al.

(10) Patent No.: US 8,318,349 B2
(45) Date of Patent: Nov. 27, 2012

(54) NEGATIVE ELECTRODE ACTIVE MATERIAL FOR NICKEL-METAL HYDRIDE BATTERY AND NICKEL-METAL HYDRIDE BATTERY USING THE SAME, AND METHOD FOR TREATING NEGATIVE ELECTRODE ACTIVE MATERIAL FOR NICKEL-METAL HYDRIDE BATTERY

(75) Inventors: Hideaki Ohyama, Kanagawa (JP);
Kyoko Nakatsuji, Kanagawa (JP);
Yoshitaka Dansui, Kanagawa (JP)

(73) Assignee: Panasonic Corporation, Osaka (JP)

( * ) Notice: Subject to any disclaimer, the term of this patent is extended or adjusted under 35 U.S.C. 154(b) by 595 days.

(21) Appl. No.: 12/518,471

(22) PCT Filed: Aug. 29, 2008

(86) PCT No.: PCT/JP2008/002364
§ 371 (c)(1),
(2), (4) Date: Jun. 10, 2009

(87) PCT Pub. No.: WO2009/037806
PCT Pub. Date: Mar. 26, 2009

(65) Prior Publication Data
US 2010/0009259 A1 Jan. 14, 2010

(30) Foreign Application Priority Data
Sep. 19, 2007 (JP) ................................. 2007-241880

(51) Int. Cl.
*H01M 4/58* (2010.01)
*H01M 10/26* (2006.01)
*H01M 4/00* (2006.01)

(52) U.S. Cl. .................. 429/218.2; 429/206; 429/223; 429/231.6

(58) Field of Classification Search ............... 429/218.2, 429/223, 231.3, 231.6, 206; 252/182.1
See application file for complete search history.

(56) References Cited

U.S. PATENT DOCUMENTS
6,130,006 A   10/2000   Kohno et al.

FOREIGN PATENT DOCUMENTS

| EP | 0 892 451 | * | 1/1999 |
|---|---|---|---|
| EP | 0 892 451 A2 | | 1/1999 |
| JP | 07-099055 | | 4/1995 |
| JP | 2000-021439 | | 1/2000 |
| JP | 2000-200599 | | 7/2000 |
| JP | 2000-265229 | | 9/2000 |
| JP | 2002-083593 | | 3/2002 |
| JP | 2007-165277 | | 6/2007 |

* cited by examiner

*Primary Examiner* — Ula C. Ruddock
*Assistant Examiner* — Thomas H. Parsons
(74) *Attorney, Agent, or Firm* — McDermott Will & Emery LLP

(57) ABSTRACT

A negative electrode active material for a nickel-metal hydride battery of the present invention includes a hydrogen storage alloy, the hydrogen storage alloy containing La, Mg, Ni, Co, Al, and element M. The molar ratio y of Ni to the total of La and Mg is $2 \leq y \leq 3$, the molar ratio z of Co to the total of La and Mg is $0.25 \leq z \leq 0.75$, the molar ratio $\alpha$ of Al to the total of La and Mg is $0.01 \leq \alpha \leq 0.05$, and the molar ratio x of Mg to the total of La and Mg is $0.01 \leq x \leq 0.5$. Element M represents at least one selected from the group consisting of Y and Sn, and the content of element M in the hydrogen storage alloy is 0.4 wt % or less.

9 Claims, 1 Drawing Sheet

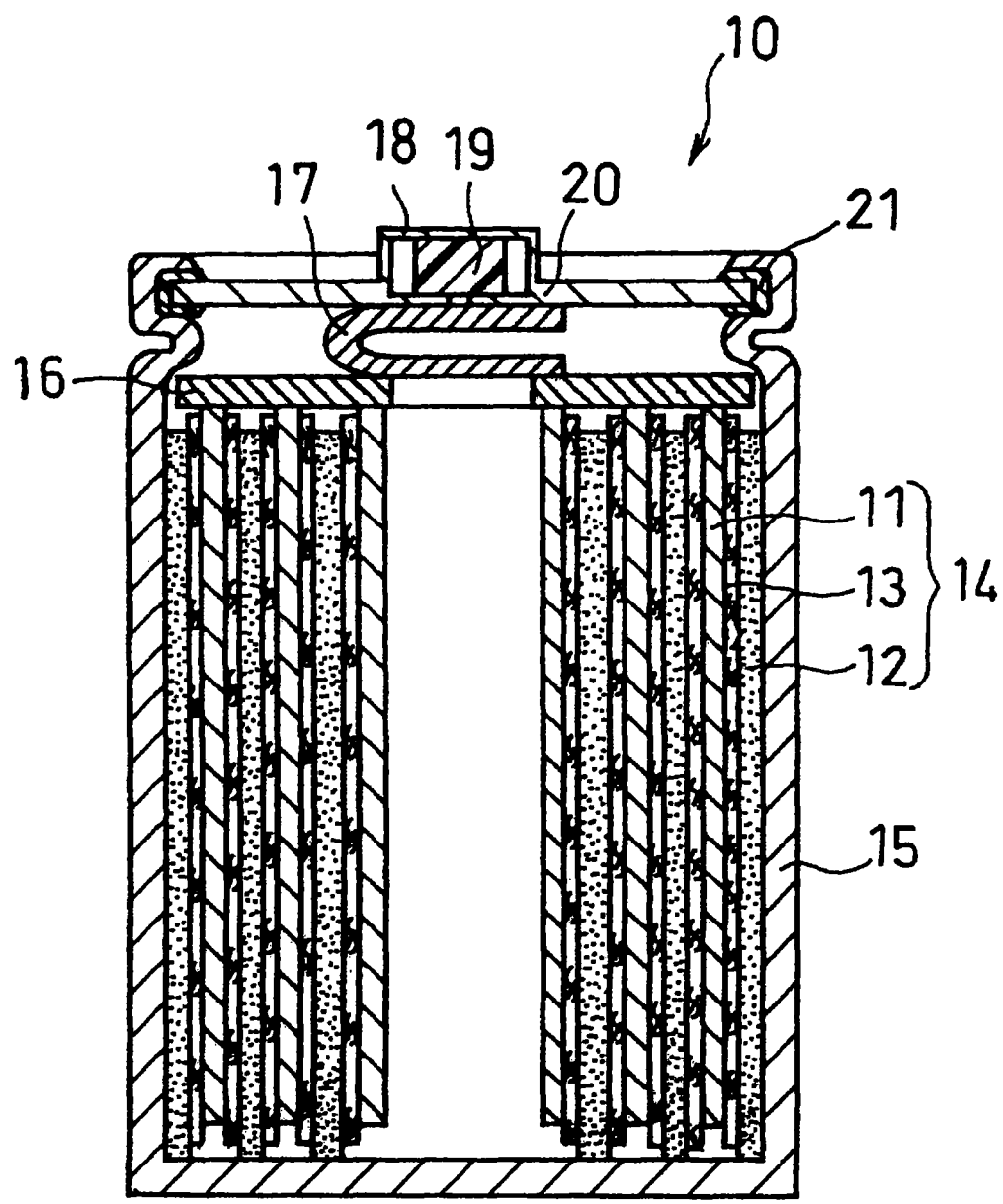

NEGATIVE ELECTRODE ACTIVE MATERIAL FOR NICKEL-METAL HYDRIDE BATTERY AND NICKEL-METAL HYDRIDE BATTERY USING THE SAME, AND METHOD FOR TREATING NEGATIVE ELECTRODE ACTIVE MATERIAL FOR NICKEL-METAL HYDRIDE BATTERY

RELATED APPLICATIONS

This application is the U.S. National Phase under 35 U.S.C. §371 of International Application No. PCT/JP2008/002364, filed on Aug. 29, 2008, which in turn claims the benefit of Japanese Application No. 2007-241880, filed on Sep. 19, 2007, the disclosures of which Applications are incorporated by reference herein.

TECHNICAL FIELD

The present invention relates mainly to a negative electrode active material used for a nickel-metal hydride battery, and more specifically relates to improvements to a hydrogen storage alloy serving as the negative electrode active material.

BACKGROUND ART

Nickel-metal hydride batteries including a hydrogen storage alloy as a negative electrode active material are excellent in output characteristics and high in durability (life characteristics and storage characteristics). For this reason, such nickel-metal hydride batteries have been attracting attention as a power source for electric automobiles and the like. In recent years, however, lithium ion secondary batteries have also been used for this application. Therefore, in view of making the nickel-metal hydride batteries more advantageous, it is desired to improve the output characteristics and the durability of nickel-metal hydride batteries.

For the hydrogen storage alloy, an alloy having a $CaCu_5$ type ($AB_5$ type) crystal structure is mainly used. In view of enhancing the durability, among the alloy having an $AB_5$ type crystal structure, $MmNi_5$, where Mm is a mixture of rare earth elements, has been used, and a part of Ni contained in this alloy has been replaced with another element, such as Co, Mn, Al or Cu.

In view of enhancing the durability as well as achieving a further improvement in capacity, one proposal suggests replacing part of rare earth elements including Y that are located at the A sites with a 2A group element such as Mg, and further controlling the magnetic susceptibility of the hydrogen storage alloy while the battery is in use (see Patent Document 1). Patent Document 1 discloses that, by configuring as described above, a high capacity nickel-metal hydride rechargeable battery having an improved cycle life and an improved discharge capacity at low temperature of about $-20°$ C. can be provided.

Patent Document 1: Japanese Laid-Open Patent Publication No. 2002-083593

DISCLOSURE OF THE INVENTION

Problem to be Solved by the Invention

With the technique as disclosed in Patent Document 1, it is possible to achieve a higher capacity and improve the cycle life and discharge capacity at low temperature of about $-20°$ C., but it is difficult to improve the life characteristics at high temperature.

The present invention provides a solution to the above-described problem and intends to provide a high capacity nickel-metal hydride battery having improved life characteristics at high temperature.

Means for Solving the Problem

As a result of studies, the present inventors have found the following. In the hydrogen storage alloy disclosed in Patent Document 1, part of rare earth elements including Y located at the A sites of the $AB_5$ type crystal structure are replaced with Mg; and at the B sites, in addition to Ni, Al, and Co, other elements such as Fe, Ga, Zn, Sn, Cu, Si, B, Nb, W, Mo, V, Cr, Ta, Li, P, and S are located. In the hydrogen storage alloy disclosed in Patent Document 1, the composition ratio of elements contained therein is not optimized in such a way that good life characteristics are obtained at high temperature. As such, the repetition of charge and discharge in a high temperature environment causes the hydrogen storage alloy to deteriorate. Specifically, as charge and discharge are repeated in a high temperature environment, the hydrogen storage alloy repeatedly expands and contracts, causing the deterioration of the hydrogen storage alloy, and causing the atoms contained in the hydrogen storage alloy to be severely leached therefrom. In short, with the repetition of charge and discharge, the battery reaction becomes insufficient.

Based on the foregoing findings, the present inventors have conducted intensive studies and found, although the details remain unclear, that a hydrogen storage alloy containing a predetermined element selected from the group consisting of La, Mg, Y, Ni, Co, Al, and Sn and having an optimized composition of elements contained therein provides a good effect. Moreover, it has been also found that the content of the predetermined element is preferably that at the level of impurity. Specifically, it has been found that: when the elements located at the B sites include Co and Al, and the contents of these elements are optimized, it is possible to suppress the deterioration of the hydrogen storage alloy caused by the repetition of charge and discharge in a high temperature environment; and it is effective to add a small amount of element M representing at least one selected from the group consisting of Y and Sn.

Accordingly, a negative electrode active material for a nickel-metal hydride battery of the present invention includes a hydrogen storage alloy, the hydrogen storage alloy containing La, Mg, Ni, Co, Al, and element M, wherein
a molar ratio x of Mg to the total of La and Mg is $0.01 \leq x \leq 0.5$,
a molar ratio y of Ni to the total of La and Mg is $2 \leq y \leq 3$,
a molar ratio z of Co to the total of La and Mg is $0.25 \leq z \leq 0.75$,
a molar ratio $\alpha$ of Al to the total of La and Mg is $0.01 \leq \alpha \leq 0.05$,
element M represents at least one selected from the group consisting of Y and Sn, and
a content of element M is 0.4 wt % or less of the hydrogen storage alloy.

Further, the present invention relates to a method for treating the above-described negative electrode active material for a nickel-metal hydride battery, and a negative electrode active material prepared by the treatment method. The treatment method includes the step of stirring the above-described negative electrode active material for a nickel-metal hydride battery in an aqueous alkaline solution.

Furthermore, the present invention relates to a nickel-metal hydride battery including a positive electrode, a negative electrode including the above-described negative electrode active material, a separator interposed therebetween, and an electrolyte.

Effect of the Invention

In the present invention, the composition of elements contained in the hydrogen storage alloy is optimized so that the grain boundaries present in the hydrogen storage alloy exhibit high corrosion resistance, and the inhibition of the hydrogen storage reaction is suppressed. Therefore, by using a negative electrode active material including the above-described hydrogen storage alloy, it is possible to provide a nickel-metal hydride battery in which the discharge efficiency at high temperature is improved, and the drop in capacity due to repeated charge and discharge is suppressed. Moreover, by including a predetermined element in an amount at the level of impurity, the discharge efficiency at high temperature can be further improved, and the drop in capacity due to repeated charge and discharge can be further suppressed.

BRIEF DESCRIPTION OF THE DRAWING

FIG. 1 is a longitudinal cross-sectional view schematically showing a nickel-metal hydride battery fabricated in Examples.

BEST MODE FOR CARRYING OUT THE INVENTION

The negative electrode active material for a nickel-metal hydride battery of the present invention includes a hydrogen storage alloy containing La, Mg, Ni, Co, Al, and element M. The molar ratio y of Ni to the total of La and Mg is $2 \leq y \leq 3$, the molar ratio z of Co to the total of La and Mg is $0.25 \leq z \leq 0.75$, the molar ratio $\alpha$ of Al to the total of La and Mg is $0.01 \leq \alpha \leq 0.05$, and the molar ratio x of Mg to the total of La and Mg is $0.01 \leq x \leq 0.5$. Element M represents at least one selected from the group consisting of Y and Sn, and the content of element M is 0.4 wt % or less of the hydrogen storage alloy. The above-described hydrogen storage alloy has a $Ce_2Ni_7$ type crystal structure.

In the present invention, the content of element M refers to the content of each element represented by element M, Y and Sn. For example, in the case where element M contains either Y or Sn, the content of element M (either Y or Sn) in the hydrogen storage alloy is 0.4 wt % or less. In the case where element M contains both Y and Sn, the content of Y and the content of Sn are respectively 0.4 wt % or less of the hydrogen storage alloy.

When the molar ratio x of Mg is less than 0.01, it is difficult to improve the capacity of the hydrogen storage alloy. When the molar ratio x exceeds 0.5, the segregation of Mg becomes evident. As a result, the negative electrode capacity is significantly reduced and the cracks due to the expansion and contraction during charge and discharge more frequently occur. Moreover, the excess segregation of Mg leads to leaching of Mg into the electrolyte during charge and discharge, causing a minor short circuit. This results in deterioration of the high-temperature life characteristics.

When the molar ratio y of Ni is less than 2, the capacity of the hydrogen storage alloy is significantly reduced. When the molar ratio y exceeds 3, the stoichiometric ratio of the elements contained in the hydrogen storage alloy does not match the stoichiometric ratio of the elements contained in a $Ce_2Ni_7$ type crystal structure. This leads to the formation of a dumb-bell-like atomic pair in the crystal structure, causing a distortion. As a result, in this case also, the capacity of the hydrogen storage alloy is significantly reduced.

When the molar ratio z of Co is less than 0.25, the hydrogen equilibrium pressure of the hydrogen storage alloy increases as a charge-discharge cycle is repeated at high temperature, and thus the capacity of the hydrogen storage alloy is reduced. This causes a deterioration of the high-temperature life characteristics. When the molar ratio z exceeds 0.75, the leaching of Co into the electrolyte at high temperature is significantly increased, resulting in a deterioration of the high-temperature life characteristics.

When the molar ratio $\alpha$ of Al is less than 0.01, the hydrogen equilibrium pressure of the hydrogen storage alloy increases as a charge-discharge cycle is repeated at high temperature, and thus the capacity of the hydrogen storage alloy is reduced. This causes the deterioration of the high-temperature life characteristics. When the molar ratio $\alpha$ exceeds 0.05, the leaching of Al into the electrolyte at high temperature is significantly increased, resulting in a deterioration of the high-temperature life characteristics.

The presence of Y in the hydrogen storage alloy improves the corrosion resistance at high temperature of the hydrogen storage alloy. Y, because of its high affinity for oxygen, is capable of reducing a neighboring oxide. This property of Y can be explained in terms of the electronegativity defined by Pauling. The bonding energy between predetermined two different elements is related to the square of a difference between the Pauling's electronegativities of the two elements. The larger the difference is, the larger the bonding energy is. The values of electronegativity of Y, Ni, Co, and Al are 1.2, 1.8, 1.8, and 1.5, respectively. The value of electronegativity of O is 3.5. Accordingly, Y has a high affinity for O, as compared with other elements located at the B sites (Ni, Co, and Al). Presumably for this reason, the corrosion resistance at high temperature is improved.

It should be noted that when the content of Y exceeds 0.4 wt % of the hydrogen storage alloy, Y may be substituted for the elements present at the crystal lattice site of the alloy. When this occurs, the hydrogen storage alloy will have a reduced capacity and lattice defects, possibly resulting in a reduction of the durability.

The presence of Sn in the hydrogen storage alloy suppresses the expansion and contraction of the hydrogen storage alloy that occurs in association with absorption and desorption of hydrogen at high temperature. The reason why this effect is brought about by the presence of Sn in the hydrogen storage alloy is currently still under diligent analysis, but is considered as follows. The metallic bond radii of La, Mg, Ni, Co, Al, and Sn are 0.188 nm, 0.160 nm, 0.125 nm, 0.125 nm, 0.143 nm, and 0.158 nm, respectively. As such, Sn has a large metallic bond radius at almost the same level as L and Mg, which are elements located at the A sites. At the B sites, Ni, Co, Al and Sn are located. The metallic bond radius of Sn is comparatively larger than those of the other elements located at the B sites (Ni, Co, and Al). The possibility is that Sn, which has a comparatively large metallic bond radius, partially occupies the B sites, and therefore has an influence on the suppression of the expansion and contraction of the hydrogen storage alloy that occurs in association with absorption and desorption of hydrogen at high temperature.

It should be noted when the content of Sn exceeds 0.4 wt %, the segregation of Sn becomes evident, and thus the hydrogen storage alloy will have a reduced capacity and lattice defects, possibly resulting in a reduction of the durability.

The lower limit of the content of element M is preferably 0.01 wt % of the hydrogen storage alloy. More preferably, the content of element M is 0.2 to 0.4 wt % of the hydrogen storage alloy.

In a preferred hydrogen storage alloy used in the present invention, a preferred molar ratio of La, Mg, Ni, Co, and Al is, for example, $La_{0.7}Mg_{0.3}Ni_{2.75}CO_{0.5}Al_{0.05}$, $La_{0.6}Mg_{0.4}Ni_{2.75}CO_{0.5}Al_{0.05}$, $La_{0.7}Mg_{0.3}Ni_{2.75}CO_{0.4}Al_{0.05}$, or the like.

A method for preparing the above-described hydrogen storage alloy is not particularly limited. Examples of the method include plasma arc melting, high-frequency melting (die casting), mechanical alloying (mechanic alloying), mechanical milling, and rapid solidification. Specifically, examples of the rapid solidification include methods as described in An Kinzoku Zairyo Katsuyou Jiten (metal material application manual) (Industrial Research Center of Japan, 1999), such as roll spinning, melt dragging, direct casting and rolling, in-rotating liquid spinning, spray forming, gas atomization, wet atomization, splat cooling, rapid-solidificated-ribbon grinding, gas atomization and splat cooling, melt extraction, spray forming, and rotating electrode processing.

The mechanical alloying are mechanical milling are effective synthesizing methods in that the size (particle diameter) and the crystal form of the hydrogen storage alloy can be easily controlled. The rapid solidification may be used alone or in combination with the mechanical alloying and the like.

As a starting material used in these methods, a mixture containing elementary La, Mg, Ni, Co, Al, Y and Sn at a predetermined ratio may be used.

The negative electrode active material for a nickel-metal hydride battery including the above-described hydrogen storage alloy may be subjected to treatment comprising the step of stirring the negative electrode active material in an aqueous alkaline solution.

In preparing the hydrogen storage alloy, there may be a case where Mg is segregated in excess at the surface of the hydrogen storage alloy. The Mg segregated in excess will leach into the electrolyte duding charge and discharge, and consequently, when the charge and discharge is repeated, Mg will deposit, for example, on the negative electrode, causing a minor short circuit.

For this reason, the negative electrode active material for a nickel-metal hydride battery, specifically, the hydrogen storage alloy is subjected to alkaline treatment, whereby the Mg segregated in excess at the surface of the hydrogen storage alloy can be removed.

The aqueous alkaline solution may contain sodium hydroxide and/or potassium hydroxide. Specifically, the aqueous alkaline solution may be an aqueous sodium hydroxide solution or an aqueous potassium hydroxide solution or an aqueous solution containing both sodium hydroxide and potassium hydroxide.

The concentration of hydroxide ion ($OH^-$) contained in the above aqueous alkaline solution is preferably 3 to 20 mol/L.

For example, in the case where the aqueous alkaline solution is an aqueous potassium hydroxide (KOH) solution, the concentration of hydroxide ion in the aqueous KOH solution is preferably 3 to 20 mol/L. When the concentration of hydroxide ion in the aqueous KOH solution is less than 3 mol/L, the surface treatment of the hydrogen storage alloy may not proceed sufficiently. When the concentration of hydroxide ion contained in the aqueous KOH solution exceeds 20 mol/L, KOH may be precipitated even at room temperature in the aqueous KOH solution. Because of this, the productivity may be significantly reduced or the reproducibility of the alkaline treatment may be noticeably degraded.

In the case where the aqueous alkaline solution is an aqueous sodium hydroxide (NaOH) solution, the concentration of hydroxide ion in the aqueous NaOH solution is preferably 10 to 20 mol/L. When the concentration of hydroxide ion in the aqueous NaOH solution is less than 10 mol/L, the reaction for removing reprecipitated matter (e.g., a hydroxide including the element leached from the A sites of the hydrogen storage alloy) does not proceed, and the surface treatment capability may be degraded. When the concentration of hydroxide ion in the aqueous NaOH solution exceeds 20 mol/L, NaOH may be precipitated even at room temperature in the aqueous NaOH solution. Because of this, the productivity may be significantly reduced or the reproducibility of the alkaline treatment may be noticeably degraded.

Preferably, the treatment temperature in the first step is 80 to 150° C. When the treatment temperature is lower than 80° C., it is unlikely that the desired reaction will occur. When the treatment temperature is higher than 150° C., the temperature of the aqueous alkaline solution (e.g., the aqueous KOH solution and the aqueous NaOH solution) approaches its boiling point, irrespective of its concentration, and as a result, troubles such as a bumping of the aqueous alkaline solution is likely to occur. Taking the material and the structure of a treatment apparatus into consideration, the practical optimum range of the treatment temperature is 80 to 120° C.

The above-described treatment can be performed using, for example, a treatment apparatus comprising a first means for mixing and/or stirring a hydrogen storage alloy and an aqueous alkaline solution, a second means for heating the mixture of the hydrogen storage alloy and the aqueous alkaline solution, a third means for controlling the temperature of the aqueous alkaline solution in the second means, a forth means for draining the waste fluid of the aqueous alkaline solution, a fifth means for filtering under pressure the hydrogen storage alloy, and a sixth means for introducing the aqueous alkaline solution into the first and/or the fifth means.

The type and the content of an element contained in the hydrogen storage alloy can be determined, for example, by ICP emission spectrometry. The ICP emission spectrometry can be performed using an inductively coupled plasma (ICP) emission spectrometer as specified in JIS K0116. Specifically, an alloy sample is subjected to pretreatment with acid such as nitric acid or hydrochloric acid (e.g., heat melting), and the resultant sample solution is atomized and introduced into the plasma torch in the spectrometer to measure the emission of a specific element. From the wavelength and the intensity of the emission, the type of the element contained in the sample and the content thereof can be quantified.

With regard to the accuracy of the analysis using an ICP emission spectrometer when repeatedly performed, the relative standard deviation of measured values is, for example, less than 1%.

The above-described hydrogen storage alloy is used as a negative electrode active material for a nickel-metal hydride battery. The nickel-metal hydride battery includes, for example, a positive electrode, a negative electrode including the above-described hydrogen storage alloy, a separator interposed between the positive electrode and the negative electrode, and an electrolyte.

As the positive electrode, any positive electrode known in the art containing nickel hydroxide as a positive electrode active material may be used.

The negative electrode may include a negative electrode core material and a negative electrode material mixture containing the above-described hydrogen storage alloy as a negative electrode active material. The negative electrode material mixture may include, as needed, a conductive agent, a thickener, and a binder, in addition to the negative electrode active material.

As the conductive agent, any material with electron conductivity may be used without any particular limitation. Preferred examples of such a material include graphites, such as natural graphite (flake graphite, etc.), artificial graphite, exfoliated graphite; carbon blacks, such as acetylene black, Ketjen black, channel black, furnace black, lamp black, and thermal black; electrically conductive fibers, such as carbon fiber and metallic fiber; metallic powders, such as copper powder; electrically conductive organic materials, such as polyphenylene derivatives, and the like. Among these, artificial graphite, Ketjen black, and carbon fiber are more preferred. These materials may be used alone or in combination of two or more. The conductive agent may be present as a coating layer that coats the surface of the hydrogen storage alloy.

The adding amount of conductive agent is preferably 0.1 to 50 parts by weight and more preferably 0.1 to 30 parts by weight per 100 parts by weight of the negative electrode active material, but not limited thereto.

As the thickener, any material capable of imparting viscosity to a material mixture paste being a precursor of the negative electrode material mixture may be used without any particular limitation. Preferred examples of such a material include carboxymethylcellulose and modified materials thereof, polyvinyl alcohol, methyl cellulose, polyethylene oxide, and the like.

As the binder, any material capable of allowing the negative electrode material mixture to be adhered to the negative electrode core material may be used without any particular limitation. For example, either a thermoplastic resin or a thermosetting resin may be used as the binder. Examples of the material to be used for the binder include styrene-butadiene copolymer rubber, polyethylene, polypropylene, polytetrafluoroethylene, polyvinylidene fluoride, tetrafluoroethylene-hexafluoropropylene copolymer, tetrafluoroethylene-perfluoroalkyl vinyl ether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoropropylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethyl vinyl ether-tetrafluoroethylene copolymer, ethylene-acrylic acid copolymer, ($Na^+$) ion cross-linked ethylene-acrylic acid copolymer, ethylene-methacrylic acid copolymer, ($Na^+$) ion cross-linked ethylene-methacrylic acid copolymer, ethylene-methyl acrylate copolymer, ($Na^+$) ion cross-linked ethylene-methyl acrylate copolymer, ethylene-methyl methacrylate copolymer, ($Na^+$) ion cross-linked ethylene-methyl methacrylate copolymer, and the like. These materials may be used alone or in combination of two or more.

As the separator, for example, nonwoven fabric made of polyolefin such as polypropylene may be used.

As the electrolyte, a solution prepared by dissolving sodium hydroxide or lithium hydroxide in an aqueous potassium hydroxide solution with a specific gravity of about 1.30 may be used.

The invention is hereinafter described by way of Examples. However, these Examples are not to be construed as limiting the invention.

EXAMPLES (i) Preparation of Hydrogen Storage Alloys of Examples 1 to 21 and Comparative Examples 1 to 11

Metallic La, Mg, Y, Ni, Co, Al, and Sn were mixed in a predetermined ratio. The resultant mixture was melted in a high-frequency melting furnace at 1480° C. The molten matter thus obtained was rapidly cooled by roll rapid cooling to be solidified, whereby an ingot of hydrogen storage alloy was obtained. The composition of the resultant hydrogen storage alloy is shown in Table 1. In Table 1, the resultant hydrogen storage alloy is represented, for convenience, by $La_{1-x}Mg_x Ni_y Co_z Al_\alpha(M)$, where M is at least one selected from the group consisting of Y and Sn. In Table 1, the content of element M is expressed in terms of weight percent and the contents of other elements are expressed in terms of molar ratio.

The ingot thus obtained was heated at 800° C. for 5 hours in argon atmosphere, and then crushed to an average particle size of 30 μm. In the manner as described above, negative electrode active materials of Examples 1 to 21 and Comparative Examples 1 to 11 were obtained.

(ii) Production of Negative Electrode

A material mixture paste was prepared by kneading 100 parts by weight of the negative electrode active material obtained in the manner as described above, 0.15 part by weight of carboxymethylcellulose (CMC) (degree of etherification: 0.7, and degree of polymerization: 1600), 0.3 part by weight of acetylene black (AB), 0.7 part by weight of styrene-butadiene copolymer rubber (SBR), and an appropriate amount of water. The resultant material mixture paste was applied onto both surfaces of a core material made of nickel-plated iron punched metal (thickness: 60 μm, aperture diameter: 1 mm, aperture rate: 42%). The material mixture paste was dried and pressed together with the core material between rollers. The electrode plate thus obtained was cut, whereby a negative electrode of 0.4 mm in thickness and 35 mm in width having a capacity of 2200 mAh was obtained.

(iii) Fabrication of Nickel-Metal Hydride Battery

As the positive electrode, a sintered nickel positive electrode having a capacity of 1500 mAh was used. The positive electrode was provided with a positive electrode core material exposed potion (width: 35 mm) along one side thereof parallel to the longitudinal direction thereof.

The positive electrode and the negative electrode as described above were used to fabricate a 4/5A size nickel-metal hydride battery having a nominal capacity of 1500 mAh as shown in FIG. 1.

Specifically, a positive electrode 11, a separator (thickness: 100 μm) 13, and a negative electrode 12 were laminated to give a laminate. The laminate was wound spirally to form a columnar electrode assembly 14. As the separator 13, a sulfonated polypropylene non-woven fabric was used. The electrode assembly was formed such that the outermost layer of the electrode assembly was the negative electrode, and the positive electrode core material exposed portion was protruded at one end surface (a first end surface) of the electrode assembly in the direction along the winding axis thereof.

A positive electrode current collector plate 16 was welded to the positive electrode core material protruding at the first end surface of the electrode assembly. One end of a positive electrode lead 18 was connected to the positive electrode current collector plate 16, and the other end of the positive electrode lead 17 was connected to a sealing plate 20 provided with an external terminal 18 and a safety vent mechanism composed of a rubber vent 19, so that the sealing plate 20 and the positive electrode current collector plate 16 were electrically connected.

The electrode assembly 14 was housed in a battery case 15 comprising a bottomed cylindrical can. The electrode assembly 14 was housed in the battery case 15 such that the negative electrode in the outermost layer of the electrode assembly 14 was brought into contact with the battery case 15.

Subsequently, an electrolyte was injected into the battery case. The electrolyte was prepared by dissolving lithium hydroxide at a concentration of 40 g/L in an aqueous potassium hydroxide solution with a specific gravity of 1.3.

Finally, the opening end of the battery case 15 was crimped onto the sealing plate 20 with a gasket 21, which was placed on the periphery of the sealing plate 20, interposed therebetween, to seal the opening of the battery case. A nickel-metal hydride battery 10 was thus produced.

Batteries including the negative electrode active materials of Examples 1 to 21 and Comparative Examples 1 to 11 were referred to as batteries of Examples 1 to 21 and Comparative Examples 1 to 11, respectively.

(iv) Life Characteristics at High Temperature

The nickel-metal hydride battery of each Example and Comparative Example was charged at a current corresponding to 10 hour rate (150 mA) in an environment of 40° C. Thereafter, the charged battery was discharged at a current corresponding to 5 hour rate (300 mA) until the battery voltage reached 1.0 V. This charge-discharge cycle was repeated 100 times in total. The ratio of a discharge capacity at the 100th cycle to a discharge capacity at the 2nd cycle was calculated as a percentage, which was referred to as a capacity retention rate. The obtained results are shown in Table 1.

TABLE 1

| | $La_{1-x}Mg_xNi_yCo_zAl_\alpha(M)$ (M = Sn and/or Y) | | | | | Capacity retention rate (%) |
|---|---|---|---|---|---|---|
| | x | y | z | α | Sn (wt %) | Y (wt %) | |
| Com. Ex. 1 | 0.005 | 2.75 | 0.3 | 0.03 | 0.02 | 0.2 | 67 |
| Ex. 1 | 0.01 | 2.75 | 0.3 | 0.03 | 0.02 | 0.2 | 87 |
| Ex. 2 | 0.3 | 2.75 | 0.3 | 0.03 | 0.02 | 0.2 | 87 |
| Ex. 3 | 0.5 | 2.75 | 0.3 | 0.03 | 0.02 | 0.2 | 87 |
| Com. Ex. 2 | 0.6 | 2.75 | 0.3 | 0.03 | 0.02 | 0.2 | 70 |
| Com. Ex. 3 | 0.3 | 1 | 0.3 | 0.03 | 0.02 | 0.2 | 72 |
| Ex. 4 | 0.3 | 2 | 0.3 | 0.03 | 0.02 | 0.2 | 88 |
| Ex. 5 | 0.3 | 2.5 | 0.3 | 0.03 | 0.02 | 0.2 | 87 |
| Ex. 6 | 0.3 | 3 | 0.3 | 0.03 | 0.02 | 0.2 | 86 |
| Com. Ex. 4 | 0.3 | 4 | 0.3 | 0.03 | 0.02 | 0.2 | 65 |
| Com. Ex. 5 | 0.3 | 2.75 | 0.2 | 0.03 | 0.02 | 0.2 | 64 |
| Ex. 7 | 0.3 | 2.75 | 0.25 | 0.03 | 0.02 | 0.2 | 84 |
| Ex. 8 | 0.3 | 2.75 | 0.5 | 0.03 | 0.02 | 0.2 | 87 |
| Ex. 9 | 0.3 | 2.75 | 0.75 | 0.03 | 0.02 | 0.2 | 88 |
| Com. Ex. 6 | 0.3 | 2.75 | 1 | 0.03 | 0.02 | 0.2 | 73 |
| Com. Ex. 7 | 0.3 | 2.75 | 0.3 | 0.005 | 0.02 | 0.2 | 69 |
| Ex. 10 | 0.3 | 2.75 | 0.3 | 0.01 | 0.02 | 0.2 | 87 |
| Ex. 11 | 0.3 | 2.75 | 0.3 | 0.02 | 0.02 | 0.2 | 87 |
| Ex. 12 | 0.3 | 2.75 | 0.3 | 0.05 | 0.02 | 0.2 | 85 |
| Com. Ex. 8 | 0.3 | 2.75 | 0.3 | 0.1 | 0.02 | 0.2 | 70 |
| Ex. 13 | 0.3 | 2.75 | 0.3 | 0.01 | 0.01 | 0.01 | 84 |
| Ex. 14 | 0.3 | 2.75 | 0.3 | 0.02 | 0.2 | 0.2 | 85 |
| Ex. 15 | 0.3 | 2.75 | 0.3 | 0.05 | 0.4 | 0.4 | 76 |
| Com. Ex. 9 | 0.3 | 2.75 | 0.3 | 0.06 | 0.8 | 0.8 | 68 |
| Ex. 16 | 0.3 | 2.75 | 0.3 | 0.01 | 0 | 0.01 | 87 |
| Ex. 17 | 0.3 | 2.75 | 0.3 | 0.02 | 0 | 0.2 | 88 |
| Ex. 18 | 0.3 | 2.75 | 0.3 | 0.05 | 0 | 0.4 | 84 |
| Com. Ex. 10 | 0.3 | 2.75 | 0.3 | 0.06 | 0 | 0.8 | 71 |
| Ex. 19 | 0.3 | 2.75 | 0.3 | 0.01 | 0.01 | 0 | 85 |
| Ex. 20 | 0.3 | 2.75 | 0.3 | 0.02 | 0.2 | 0 | 86 |
| Ex. 21 | 0.3 | 2.75 | 0.3 | 0.05 | 0.4 | 0 | 87 |
| Com. Ex. 11 | 0.3 | 2.75 | 0.3 | 0.06 | 0.8 | 0 | 69 |

The results shown in Table 1 indicate that the life characteristics in a high temperature environment can be improved by using the negative electrode active material of the present invention.

Specifically, in the battery of Comparative Example 1 including the hydrogen storage alloy having a molar ratio x of Mg of less than 0.01, the capacity retention rate was low. This was presumably because the effect obtained by adding Mg was extremely low, and consequently the negative electrode capacity was reduced.

In the battery of Comparative Example 2 including the hydrogen storage alloy having a molar ratio x of Mg of more than 0.5 also, the capacity retention rate was low. This was presumably because Mg was significantly segregated to cause a significant reduction in the negative electrode capacity and frequent cracks due to expansion and contraction during charge-discharge cycling, and consequently the capacity retention rate was also lowered.

From the results above, it was found that an appropriate range of the molar ratio x was 0.01 or more and 0.5 or less.

In the battery of Comparative Example 3 including the hydrogen storage alloy having a molar ratio y of Ni of less than 2.0, the capacity retention rate was low. This was presumably because the negative electrode capacity was reduced due to the reduced content of Ni, and consequently the capacity retention rate was also lowered.

In the battery of Comparative Example 4 including the hydrogen storage alloy having a molar ratio y of Ni of more than 3.0 also, the capacity retention rate was low. The stoichiometric ratio of the elements contained in the hydrogen storage alloy of Comparative Example 4 did not match the stoichiometric ratio of the elements contained in the $Ce_2Ni_7$ type crystal structure. This led to the formation of a dumbbell-like atomic pair in the crystal structure, causing a distortion. Presumably, as a result of this influence, the capacity was reduced, and the capacity retention rate was lowered.

From the results above, it was found that an appropriate range of the molar ratio y was 2.0 or more and 3.0 or less.

In the battery of Comparative Example 5 including the hydrogen storage alloy having a molar ratio z of Co of less than 0.25, the capacity retention rate was low. Since the content of Co was small, the hydrogen equilibrium pressure of the hydrogen storage alloy increased as the charge-discharge cycle was repeated at high temperature, and thus the capacity of the hydrogen storage alloy of Comparative Example 5 was reduced. Presumably, as a result, the capacity retention rate was lowered.

In the battery of Comparative Example 6 including the hydrogen storage alloy having a molar ratio z of Co of more than 0.75 also, the capacity retention rate was low. Presumably, a large amount of Co was leached into the electrolyte from the hydrogen storage alloy of Comparative Example 6, and as a result, the high-temperature life characteristic was deteriorated.

From the results above, it was found that an appropriate range of the molar ratio z was 0.25 or more and 0.75 or less.

In the battery of Comparative Example 7 including the hydrogen storage alloy having a molar ratio α of Al of less than 0.01, the capacity retention rate was low. Since the content of Al was small, the hydrogen equilibrium pressure of the hydrogen storage alloy increased as the charge-discharge cycle was repeated at high temperature, and thus the capacity of the hydrogen storage alloy of Comparative Example 7 was reduced. Presumably, as a result, the capacity retention rate was lowered.

In the battery of Comparative Example 8 including the hydrogen storage alloy having a molar ratio α of Al of more than 0.75 also, the capacity retention rate was low. Presumably, a large amount of Al was leached into the electrolyte from the hydrogen storage alloy of Comparative Example 8, and as a result, the high-temperature life characteristic was deteriorated.

From the results above, it was found that an appropriate range of the molar ratio α was 0.01 or more and 0.05 or less.

In the batteries of Comparative Examples 9 and 10 including the hydrogen storage alloy in which the content of Y exceeded 0.4 wt % of the hydrogen storage alloy, the capacity retention rates were low. Since the content of Y was large, Y was substituted for the elements present at the crystal lattice site of the alloy, which resulted in a reduction in capacity of the hydrogen storage alloy and a deterioration of the durability of the hydrogen storage alloy due to a creation of lattice defects, and thus the capacity retention rate was lowered.

Based on the results above, the content of Y should be 0.4 wt % or less of the hydrogen storage alloy.

In the batteries of Comparative Examples 9 and 11 including the hydrogen storage alloy in which the content of Sn exceeded 0.4 wt % of the hydrogen storage alloy, the capacity retention rates were low. Since the content of Sn was large, the segregation of Sn became evident, which resulted in a reduction in capacity of the hydrogen storage alloy and a deterioration of the durability due to a creation of lattice defects, and thus the capacity retention rate was lowered.

Based on the results above, the content of Sn should be 0.4 wt % or less of the hydrogen storage alloy.

(v) Alkaline Treatment

The hydrogen storage alloys of Examples 1 to 21 and Comparative Examples 1 to 11 were subjected to treatment with an aqueous alkaline solution (alkaline treatment). Specifically, the hydrogen storage alloy was stirred in an aqueous potassium hydroxide (KOH) solution at 100° C. for 30 minutes. The molar concentration of base ($OH^-$) in the aqueous KOH solution was 10 mol/L.

After the alkali treatment, the hydrogen storage alloy was washed with water to be dealkalized. The water content in the resultant hydrogen storage alloy powder was 3.5%.

Nickel-metal hydride batteries of Examples 22 to 42 and Comparative Examples 12 to 22 were fabricated in the same manner as in the above except that the hydrogen storage alloy having been subjected to alkaline treatment was used as the negative electrode active material.

The high temperature life characteristics of the obtained batteries of Examples 22 to 42 and Comparative Examples 12 to 22 were evaluated in the same manner as described above. The results are shown in Table 2. The content of each element in the hydrogen storage alloy used in each Example and each Comparative Example are also shown in Table 2. In Table 2 also, the content of element M is expressed in terms of weight percent and the contents of other elements are expressed in terms of molar ratio.

TABLE 2

| | $La_{1-x}Mg_xNi_yCo_zAl_\alpha(M)$ (M = Sn and/or Y) | | | | | | Capacity retention rate (%) |
|---|---|---|---|---|---|---|---|
| | x | y | z | α | Sn (wt %) | Y (wt %) | |
| Com. Ex. 12 | 0.005 | 2.75 | 0.3 | 0.03 | 0.02 | 0.2 | 68 |
| Ex. 22 | 0.01 | 2.75 | 0.3 | 0.03 | 0.02 | 0.2 | 89 |
| Ex. 23 | 0.3 | 2.75 | 0.3 | 0.03 | 0.02 | 0.2 | 89 |
| Ex. 24 | 0.5 | 2.75 | 0.3 | 0.03 | 0.02 | 0.2 | 89 |
| Com. Ex. 13 | 0.6 | 2.75 | 0.3 | 0.03 | 0.02 | 0.2 | 71 |
| Com. Ex. 14 | 0.3 | 1 | 0.3 | 0.03 | 0.02 | 0.2 | 73 |
| Ex. 25 | 0.3 | 2 | 0.3 | 0.03 | 0.02 | 0.2 | 89 |
| Ex. 26 | 0.3 | 2.5 | 0.3 | 0.03 | 0.02 | 0.2 | 89 |
| Ex. 27 | 0.3 | 3 | 0.3 | 0.03 | 0.02 | 0.2 | 88 |
| Com. Ex. 15 | 0.3 | 4 | 0.3 | 0.03 | 0.02 | 0.2 | 66 |
| Com. Ex. 16 | 0.3 | 2.75 | 0.2 | 0.03 | 0.02 | 0.2 | 65 |
| Ex. 28 | 0.3 | 2.75 | 0.25 | 0.03 | 0.02 | 0.2 | 86 |
| Ex. 29 | 0.3 | 2.75 | 0.5 | 0.03 | 0.02 | 0.2 | 88 |
| Ex. 30 | 0.3 | 2.75 | 0.75 | 0.03 | 0.02 | 0.2 | 89 |
| Com. Ex. 17 | 0.3 | 2.75 | 1 | 0.03 | 0.02 | 0.2 | 74 |
| Com. Ex. 18 | 0.3 | 2.75 | 0.3 | 0.005 | 0.02 | 0.2 | 70 |
| Ex. 31 | 0.3 | 2.75 | 0.3 | 0.01 | 0.02 | 0.2 | 89 |
| Ex. 32 | 0.3 | 2.75 | 0.3 | 0.02 | 0.02 | 0.2 | 88 |
| Ex. 33 | 0.3 | 2.75 | 0.3 | 0.05 | 0.02 | 0.2 | 87 |
| Com. Ex. 19 | 0.3 | 2.75 | 0.3 | 0.1 | 0.02 | 0.2 | 71 |
| Ex. 34 | 0.3 | 2.75 | 0.3 | 0.01 | 0.01 | 0.01 | 86 |
| Ex. 35 | 0.3 | 2.75 | 0.3 | 0.02 | 0.2 | 0.2 | 87 |
| Ex. 36 | 0.3 | 2.75 | 0.3 | 0.05 | 0.4 | 0.4 | 78 |
| Com. Ex. 20 | 0.3 | 2.75 | 0.3 | 0.06 | 0.8 | 0.8 | 69 |
| Ex. 37 | 0.3 | 2.75 | 0.3 | 0.01 | 0 | 0.01 | 89 |
| Ex. 38 | 0.3 | 2.75 | 0.3 | 0.02 | 0 | 0.2 | 90 |
| Ex. 39 | 0.3 | 2.75 | 0.3 | 0.05 | 0 | 0.4 | 86 |
| Com. Ex. 21 | 0.3 | 2.75 | 0.3 | 0.06 | 0 | 0.8 | 72 |
| Ex. 40 | 0.3 | 2.75 | 0.3 | 0.01 | 0.01 | 0 | 87 |
| Ex. 41 | 0.3 | 2.75 | 0.3 | 0.02 | 0.2 | 0 | 88 |
| Ex. 42 | 0.3 | 2.75 | 0.3 | 0.05 | 0.4 | 0 | 89 |
| Com. Ex. 22 | 0.3 | 2.75 | 0.3 | 0.06 | 0.8 | 0 | 70 |

The comparison between Table 1 and Table 2 indicates that when the hydrogen storage alloy having been subjected to alkaline treatment was used, a high capacity retention rate was obtained. Although the reason for this remains unclear, the possibility is that the hydrogen catalytic active layer having a thickness of 10 to 20 nm was formed on the surface of the hydrogen storage alloy, and the acceptability of hydrogen was maintained at an excellent level.

As described above, it is more preferable that the hydrogen storage alloy used in the present invention is subjected to alkali treatment.

Further, also in the hydrogen storage alloy having been subjected to alkaline treatment, for the same reasons as described above, the appropriate range of molar ratio x is 0.01 or more and 0.5 or less, the appropriate range of molar ratio y is 2.0 or more and 3.0 or less, the appropriate range of molar ratio z is 0.25 or more and 0.75 or less, and the appropriate range of molar ratio α is 0.01 or more and 0.05 or less. In this case also, the content of element M should be 0.4 wt % or less of the hydrogen storage alloy.

INDUSTRIAL APPLICABILITY

According to the present invention, it is possible to provide a high capacity nickel-metal hydride battery with improved high temperature life characteristics. The nickel-metal hydride battery of the present invention can be suitably used as a power source for various kinds of devices. In particular, the nickel-metal hydride battery of the present invention can be suitably used as a power source for hybrid automobiles that are used in a harsh environment.

The invention claimed is:

1. A negative electrode active material for a nickel-metal hydride battery comprising a hydrogen storage alloy, the hydrogen storage alloy containing La, Mg, Ni, Co, Al, and element M, wherein
   a molar ratio x of Mg to the total of La and Mg is $0.01 \leqq x \leqq 0.5$,
   a molar ratio y of Ni to the total of La and Mg is $2 \leqq y \leqq 3$,
   a molar ratio z of Co to the total of La and Mg is $0.25 \leqq z \leqq 0.75$,
   a molar ratio $\alpha$ of Al to the total of La and Mg is $0.01 \leqq \alpha \leqq 0.05$,
   element M represents at least one selected from the group consisting of Y and Sn, and a content of element M is 0.4 wt % or less of said hydrogen storage alloy.

2. A nickel-metal hydride battery comprising a positive electrode, a negative electrode, a separator interposed between said positive electrode and said negative electrode, and an electrolyte, wherein
   said negative electrode includes the negative electrode active material of claim 1.

3. A method for treating the negative electrode active material for a nickel-metal hydride battery of claim 1, comprising the step of
   stirring said negative electrode active material for a nickel metal hydride battery in an aqueous alkaline solution.

4. The method for treating the negative electrode active material for a nickel-metal hydride battery in accordance with claim 3, wherein
   said aqueous alkaline solution contains at least one selected from the group consisting of sodium hydroxide and potassium hydroxide.

5. A negative electrode active material for a nickel-metal hydride battery treated by the method for treating a negative electrode active material for a nickel-metal hydride battery of claim 3.

6. A nickel-metal hydride battery comprising a positive electrode, a negative electrode, a separator interposed between said positive electrode and said negative electrode, and an electrolyte, wherein
   said negative electrode includes the negative electrode wive material of claim 5.

7. The negative electrode active material for a nickel-metal hydride battery in accordance with claim 1, wherein
   the content of element M is 0.01 wt % or more and 0.4 wt % or less of said hydrogen storage alloy.

8. A negative electrode active material for a nickel-metal hydride battery comprising a hydrogen storage alloy, the hydrogen storage alloy containing La, Mg, Ni, Co, Al, and Y, wherein
   a molar ratio x of Mg to the total of La and Mg is $0.01 \leqq x \leqq 0.5$,
   a molar ratio y of Ni to the total of La and Mg is $2 \leqq y \leqq 3$,
   a molar ratio z of Co to the total of La and Mg is $0.25 \leqq z \leqq 0.75$,
   a molar ratio $\alpha$ of Al to the total of La and Mg is $0.01 \leqq \alpha \leqq 0.05$, and
   a content of Y is 0.4 wt % or less of said hydrogen storage alloy.

9. The negative electrode active material for a nickel-metal hydride battery in accordance with claim 8, wherein
   the content of Y is 0.01 wt % or more and 0.4 wt % or less of said hydrogen storage alloy.

* * * * *